(12) United States Patent
Shaw (10) Patent No.: US 7,680,838 B1
(45) Date of Patent: Mar. 16, 2010

(54) MAINTAINING DATA SYNCHRONIZATION IN A FILE-SHARING ENVIRONMENT

(75) Inventor: James Shaw, Chula Vista, CA (US)

(73) Assignee: Intuit Inc., Mountain View, CA (US)

( * ) Notice: Subject to any disclaimer, the term of this patent is extended or adjusted under 35 U.S.C. 154(b) by 620 days.

(21) Appl. No.: 10/988,178

(22) Filed: Nov. 12, 2004

(51) Int. Cl.
*G06F 12/00* (2006.01)
*G06F 17/30* (2006.01)

(52) U.S. Cl. ........................ 707/203; 709/204

(58) Field of Classification Search .............. None
See application file for complete search history.

(56) References Cited

U.S. PATENT DOCUMENTS

| | | | | |
|---|---|---|---|---|
| 5,729,735 | A * | 3/1998 | Meyering | 707/10 |
| 5,768,528 | A * | 6/1998 | Stumm | 709/231 |
| 5,870,605 | A * | 2/1999 | Bracho et al. | 719/318 |
| 6,564,215 | B1 * | 5/2003 | Hsiao et al. | 707/8 |
| 6,601,087 | B1 * | 7/2003 | Zhu et al. | 709/205 |
| 6,654,746 | B1 * | 11/2003 | Wong et al. | 707/10 |
| 6,691,154 | B1 * | 2/2004 | Zhu et al. | 709/204 |
| 2002/0019751 | A1 * | 2/2002 | Rothschild et al. | 705/3 |
| 2002/0069367 | A1 * | 6/2002 | Tindal et al. | 713/201 |
| 2003/0131016 | A1 * | 7/2003 | Tanny et al. | 707/102 |
| 2004/0210846 | A1 * | 10/2004 | Olsen | 715/761 |
| 2004/0268177 | A1 * | 12/2004 | Ji et al. | 714/6 |
| 2005/0021565 | A1 * | 1/2005 | Kapoor et al. | 707/200 |

* cited by examiner

*Primary Examiner*—Khanh B Pham
*Assistant Examiner*—Azam Cheema
(74) *Attorney, Agent, or Firm*—Park, Vaughan & Fleming LLP (57) ABSTRACT

A notification engine manages subscriptions of applications to data events in a file-sharing environment. A subscription includes a data event recovery time stamp indicating the time when a first change to subscribed data objects occurred of which an application was not aware. When the data event occurs on a computer, the engine finds applications subscribed to that data event and sets the time stamp in the subscriptions for non-local applications to the current time if the data event recovery time stamp is clear. An application that was not notified of the data event that occurred on another computer learns about the data event when it is called back. The application uses a data event recovery time stamp indicated in the callback to issue a query for a current version of subscribed data objects to which data events occurred at or after the time indicated in the time stamp.

19 Claims, 4 Drawing Sheets

MAINTAINING DATA SYNCHRONIZATION IN A FILE-SHARING ENVIRONMENT

BACKGROUND

Field of Invention

The present invention relates generally to synchronizing data among applications, and more particularly, to maintaining data synchronization in a file-sharing environment.

BACKGROUND OF THE INVENTION

QuickBooks™, a financial management software application provided by Intuit, Inc. of Mountain View, Calif., is designed to be integrated with third party software applications, such as a Customer Relationship Manager (CRM) application. A typical CRM application stores all information about customers, such as appointments, contacts, calendars, as well as customer financial transactions information from QuickBooks™. The CRM allows a user to view consolidated data about customers on one screen. When a user changes customer data in QuickBooks™ it is desirable for the integrated third party application to become aware of all the changes to customer data.

One of the existing challenges in integrating third party software applications with host applications, such as QuickBooks™, is the ability to synchronize data among the applications. In the past, there have been a number of solutions to data synchronization. One solution, known as a "pull" model, is to provide query requests for data changes in a published software development kit (SDK) to QuickBooks™. Such requests can be initiated by third party applications in response to a timed event. In response to the query, QuickBooks™ would provide a response with the appropriate data. This solution has a number of drawbacks. First, QuickBooks data maintained by third party applications is not up-to-date during the time interval when a third party application is not polling for data changes. Another drawback of a pull model is that an integrated application may poll for data changes and find no changes at all, thereby wasting CPU cycles.

To address the shortcomings of the pull model, a "push" model was introduced. In the traditional push model, the integrated third party application and host application run on the same computing device. The integrated application subscribes to data events that occur on the computing device. The host application notifies the integrated application of the data events. Subscriptions can be persisted on the computing device so that neither the host application nor the integrated application need to be running when the subscription to data events and notification of the data events occur. When the host application starts it reads the subscriptions and optionally starts the application subscribed to data events during the notification process. Hence, the traditional push model addresses all the limitations of the pull model in that it keeps the data of third party applications up-to-date and does not engage in polling for data changes, thereby not wasting CPU cycles.

The traditional push model works well in a single-machine environment. QuickBooks™, however, operates in a multiple application, file-sharing environment, i.e., a user working on a data file on computer A, can take the file to computer B and continue working with the data file on that computer. When changes occur to the data file on computer B, other applications running on computer A and integrated with QuickBooks™ need to be notified about the data changes in the data file caused by computer B. The traditional push model cannot solve this problem because it does not provide a mechanism for notifying subscribed applications about the data changes that take place on other computing devices.

In addition, QuickBooks™ can also operate in a multi-user mode in which multiple QuickBooks™ installations on multiple computers connected over a local area network (LAN) have access to the same data file stored on one of the connected computers or on a shared drive. When a change to the data file is done by QuickBooks™ on one computer, third party applications on other computers need to be notified about the change. Again, the traditional push model does not provide for a mechanism for notifying interested applications about the data changes that occur on other computing devices.

Accordingly, what is needed is a mechanism that provides notifications to applications interested in data events that occur on other computing devices in a file-sharing environment.

SUMMARY OF THE INVENTION

An event notification engine manages subscriptions of applications to data events that affect data objects in a shared data file. A data event is generated when a state of a data object is changed in a data file. A local application is one that is running on the same computing device where the data event occurred; a non-local application is one running on a different computing device from where the data event occurred. An application can be local with respect to one data event, and non-local with respect to a different data event. Subscription records are stored in data file to which a host application has access. A subscription record for each subscribed application includes, among other components, a data event recovery time stamp specifying the earliest time when a data event to which an application subscribed to has occurred and of which the subscribed application has not been notified.

When the data event occurs on a first computing device, the engine finds all applications subscribed to that data event, notifies local applications of the data event, and sets the data event recovery time stamp in the subscription record for non-local applications to the time when the data event occurred, if the time stamp is clear. When another data event occurs on a computing device executing a non-local application (and hence one that that was not notified of a data event that occurred on a first computing device), the application is notified about the current data event. The notification includes a data event recovery time stamp if the value of the time stamp is other than clear. The application uses the data event recovery time stamp to issue a query for a current version of subscribed data objects having a time stamp equal or greater to the time specified in the data event recovery time stamp. Thus, non-local applications that have not been notified of data events do not have to redundantly poll their data event recovery time stamp. Instead, they learn about changes that occur to subscribed data objects on other computing devices when they are called back to the data file at a later time.

In yet another implementation, the notification also includes a type of the data object that was changed as a result of the data event that occurred on other computing devices. The application uses the data event recovery time stamp and the type of the data object to query for a current version of the data object provided in the notification having a time stamp equal to greater to the time specified in the data event recovery time stamp. This implementation advantageously optimizes a query for data objects because the application queries only for data objects that were affected by the data event rather than querying for all subscribed data objects.

In an alternative implementation, a subscription record stores an IP address of a computing device on which a subscribed application is installed. A computing device also hosts a proxy application adapted to listen to data events. When a data event occurs on a computing device, an event notification engine uses the IP address of a computing device on which an application subscribed to the data event is running to notify a proxy application on that computing device of the data event. The notification identifies an application that subscribed to the data event. The proxy application forwards the notification to the subscribed application.

In yet another embodiment, an application learns about subscribed data events that occur on other computing devices by querying the data recovery time stamp in its subscription record. If the data event recovery time stamp is clear, it indicates that no data events occurred on other computing devices of which the application has not been notified. Accordingly, in this situation, the application does not need to query for the subscribed data objects, thereby optimizing the query process.

DETAILED DESCRIPTION OF PREFERRED EMBODIMENTS

Figure 1:
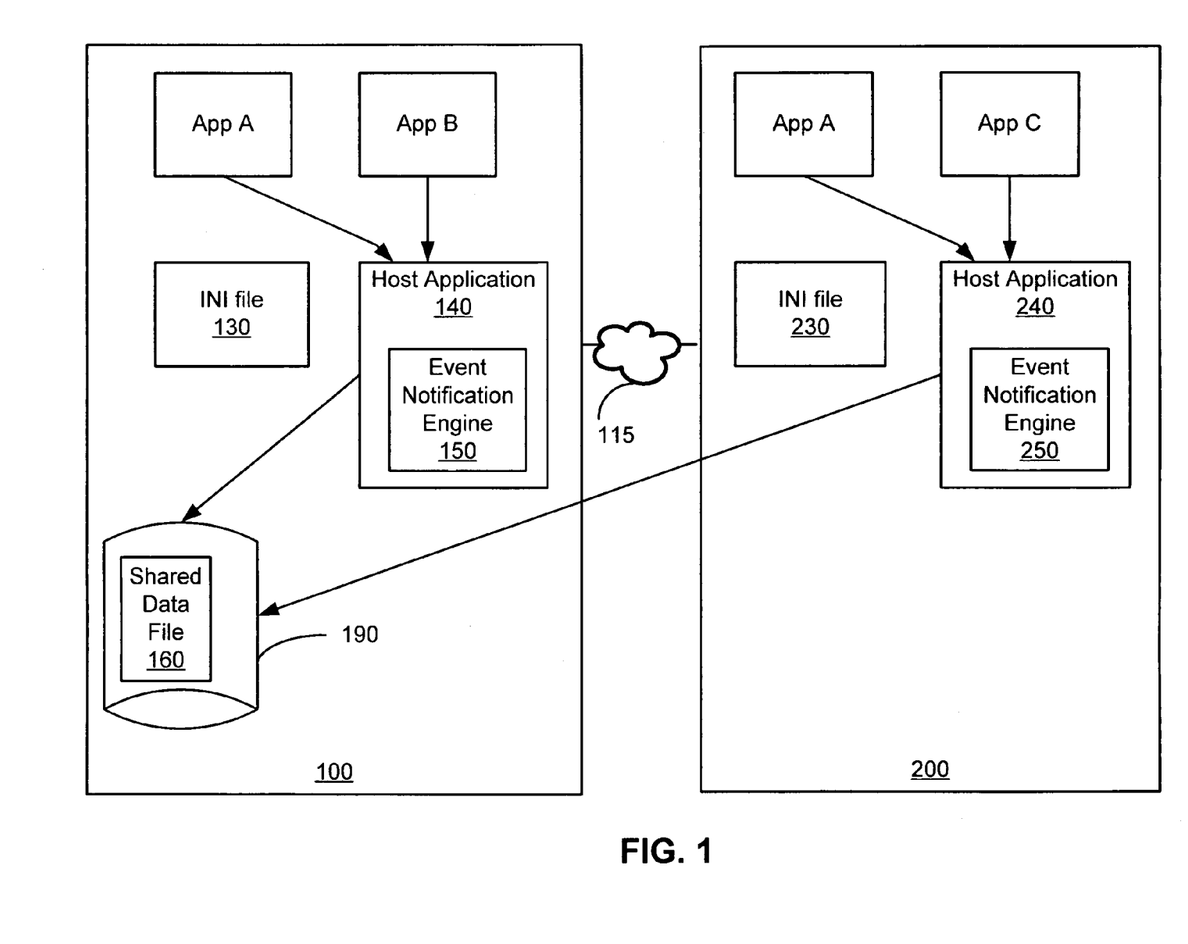
FIG. 1 is a block diagram of an example application and file sharing environment in which the present invention can operate.

FIG. 1 is a block diagram of the environment in which the present invention operates. The environment includes any number of computing devices 100 and 200, such as a conventional personal computer, peripheral, personal digital assistant (PDA), or the like, connected over communications network 115, such as Local Area Network (LAN). One skilled in the art will appreciate that although FIG. 1 depicts only two computing devices, the present invention contemplates any number of computing devices.

Computing devices 100 and 200 each execute host applications 140 and 240 respectively. Computing device 100 also executes applications integrated with the host application, and hence referred to herein as an "integrated application". Applications A and B are integrated applications. A CRM is but one example of an integrated application. Those of skill in the art can readily appreciate that many other types of 3$^{rd}$ party applications can be integrated with the host application, and the nature of these 3$^{rd}$ party applications will of course vary depending on the host application itself.

Computing device 200, in turn, executes applications A and C integrated with host application 240. One skilled in the art will understand that although only two applications integrated with host application 140 and 240 are shown as running on each computing devices 100 and 200, any number of third party integrated applications can be installed on devices 100 and 200. Computing device 100 accesses database 190. Database 190 stores a shared data file 160. Generally, data file 160 can store master data or transactional data, or a combination thereof. Data file 160 stores a plurality of data objects, such as "customers", "vendors", "accounts", etc. A data object in data file 160 has an associated time stamp, which is set to the time that an object is either updated or created.

Although in FIG. 1 data file 160 is shown as stored on device 100, one skilled in the art will understand that data file 160 can be stored on any computing device. Computing device 200 accesses data file 160 via network 115. When a user (not shown in FIG. 1) accesses shared data file 160 and makes changes to the data file 160, it is desirable for a third party application to be synchronized with the data in shared data file 160.

In an alternative embodiment, the data file 160 can be stored on network 115 so that all computing devices, such as devices 100 and 200, connected to network 115 have access to data file 160. The present invention contemplates yet another implementation in which computing devices 100 and 200 are not connected via network 115. In this embodiment, a user at computing device 100 can work on data file 160 and then take the file 160 to computing device 200 and continue working on the file 160 on device 200.

Computing device 100 also hosts an INI file 130 that stores a global unique ID (GUID) of computing device 100. Computing device 200 hosts an INI file 230 that stores a global unique ID (GUID) of computing device 200.

Host application 140 executes an event notification engine 150. Engine 150 is adapted to receive a request from applications running on device 100, such as applications A and B, to subscribe to data events that effect data objects in data file 160, create a subscription record, and store the record in the data file 160. A data event is generated when a state of a data object is changed in a data file. A data object is changed through creation, deletion, or modification. For example, when a user accesses the data file 160 and adds a customer record, a data event occurs.

Engine 150 is also adapted to notify local applications, such as applications A and B, subscribed to data events that occur on computing device 100 of those data events. Applications A and B are local applications with respect to data events that happen on device 100. Components of subscription records are described in more detail with reference to FIG. 2 below.

Like the host application 140 on the computing device 100, host application 240 on computing device 200 executes an event notification engine 250. Engine 250 is adapted to receive a request from applications, such as applications A and C, running on device 200 to subscribe to data objects in data file 160, create a subscription record, and store the record in the data file 160. Engine 250 is also adapted to notify local applications A and C about the data events that occur on computing device 200. Applications A and C running on device 200 are local applications with respect to data events that occur on device 200.

Data file 160 stores subscription records for applications A and B running on device 100 as well as for applications A and C, running on device 200. Engine 150 is also adapted to mark subscription records for non-local applications when a data event occurs on device 100. Components of engine 150 are described in more details below in reference to FIG. 2.

Event Notification Engine Architecture Overview

Figure 2:
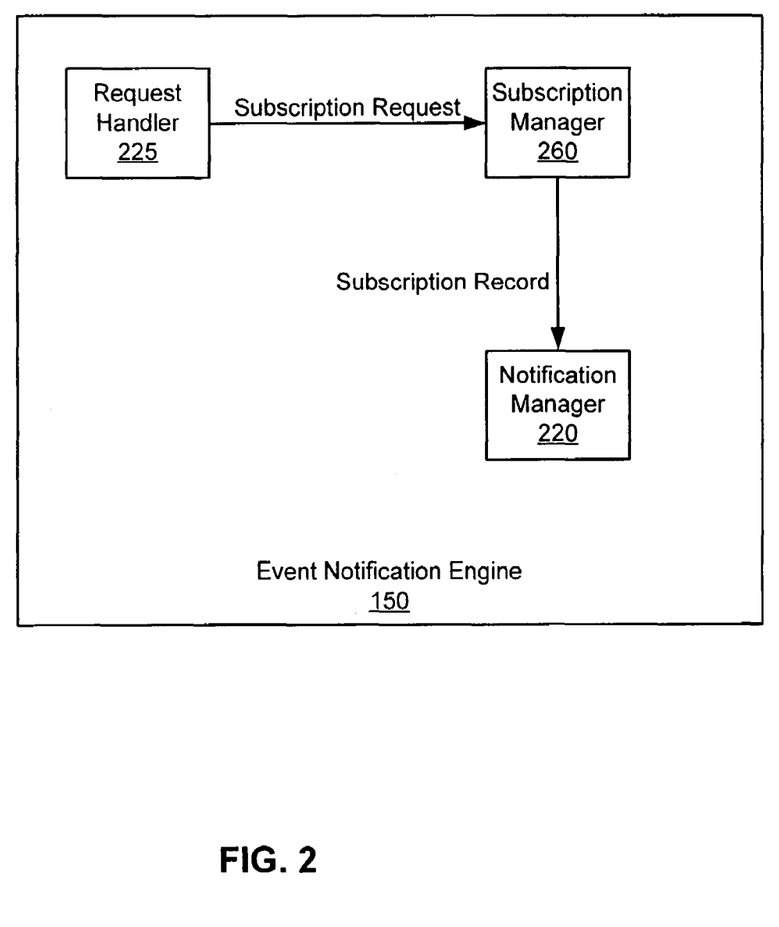
FIG. 2 is a block diagram of an embodiment of a system for providing event notification.

FIG. 2 is a block diagram of functional modules of event notification engine 150. Engine 150 includes a notification manager 220, a request handler 225, and a subscription manager 260. As used herein, the term "module" refers to computer program logic and/or any hardware to provide the functionality attributed to the module. Request handler 225 receives requests from applications to subscribe to data events. In one embodiment, a data event is the combination of a data object, and a type of operation on the object. For example, an application can subscribe to a "customer" object, and all events (e.g., any creation, modification, or deletion); similarly an application may subscribe to only a certain type of event, such as only deletions. Request handler 225 passes subscription requests to subscription manager 260. An exemplary subscription request is shown below:

```
<QBXML>
    <QBXMLSubscriptionMsgsRq>
        <DataEventSubscriptionAddRq requestID = "2">
            <DataEventSubscriptionAdd>
                <SubscriberID>{9BB243BC-6784-4028-A0E1-53EECE96BDA}</SubscriberID>
                <COMCallbackInfo>
                    <AppName>No Cert B</AppName>
                    <ProgID>Project11.Class11</ProgID>
                </COMCallbackInfo>
                <DeliveryPolicy>DeliverOnlyIfRunning</DeliveryPolicy>
                <TrackLostEvents>All</TrackLostEvents>
                <ListEventSubscription>
                    <ListEventType>Account</ListEventType>
                    <ListEventType>Vendor</ListEventType>
                    <ListEventType>Customer</ListEventType>
                    <ListEventType>ItemService</ListEventType>
                    <ListEventOperation>Add</ListEventOperation>
                    <ListEventOperation>Modify</ListEventOperation>
                    <ListEventOperation>Delete</ListEventOperation>
                    <ListEventOperation>Merge</ListEventOperation>
                </ListEventSubscription>
            </DataEventSubscriptionAdd>
        </DataEventSubscriptionAddRq>
    </QBXMLSubscriptionMsgsRq>
</QBXML>
```

In this example, a request is made to subscribe to data objects account, vendor, customer and item service and data object operations add, modify, delete, and merge. Also, in an alternative embodiment, a default subscription can be used, such as subscribing to all objects and all operations, or implied operations, such as defaulting to all operations if none are specifically listed in the request.

Subscription manager 260 receives a subscription request and creates a subscription record for a subscribed application. In one implementation, a subscription record has the following format:

{GUID, Subscriber's ID, Data Object [list of data objects], Data object operation [list of operations], DataEventRecoveryTime Stamp}

Where:

GUID indicates a global unique ID of a computing device on which a subscribed application is running;

Subscriber's ID is an identification of the subscribed application;

Data object indicates an object in the data file 160 to which an application subscribes, such as "customer", "invoice", "vendor", "account";

Data object operation indicates an operation performed on the data object, such as "add", "delete", "modify", etc;

Data Event Recovery Time Stamp specifies the earliest time when a data event occurs of which an application subscribed to that data event has not been notified. Initially, the data event recovery time stamp is clear. In one implementation, the data event recovery time stamp is clear when its value is NULL.

In one implementation, subscription records stored in data file 160 are grouped by computing device GUID. Exemplary subscription records for Applications A and B running on device 100 and applications A and C running on device 200 are shown below:

{GUID 100: Subscriber's ID: A, Customer, [Add, Modify, Delete], Data Recovery Time Stamp=0}

{GUID 100: Subscriber's ID: B, Invoice, [Add, Modify, Delete], Data Recovery Time Stamp=0}

{GUID 200: Subscriber's ID: A, Vendor, [Add, Modify, Delete], Data Recovery Time Stamp=0}

{GUID 200: Subscriber's ID: C, [Customer, Invoice], [Add, Modify, Delete], Data Recovery Time Stamp=0}

Notification manager 220 persists subscription records to the data file 160 (shown in FIG. 1). When a data event occurs, such as a customer record was added, deleted, updated, or merged, host application 140 notifies notification manager 220 about the data event. Notification manager 220, in turn, notifies all local applications subscribed to the data event. Notification manager 220 marks non-local applications subscriptions as losing events by setting their Data Event Recovery Time Stamp to the time when the data event occurs, if the Data Event Recovery Time Stamp is clear. If the Data Event Recovery Time Stamp is not clear (i.e., it is already set), then notification manager 220 won't update it.

Methods of Operation

Figure 3:
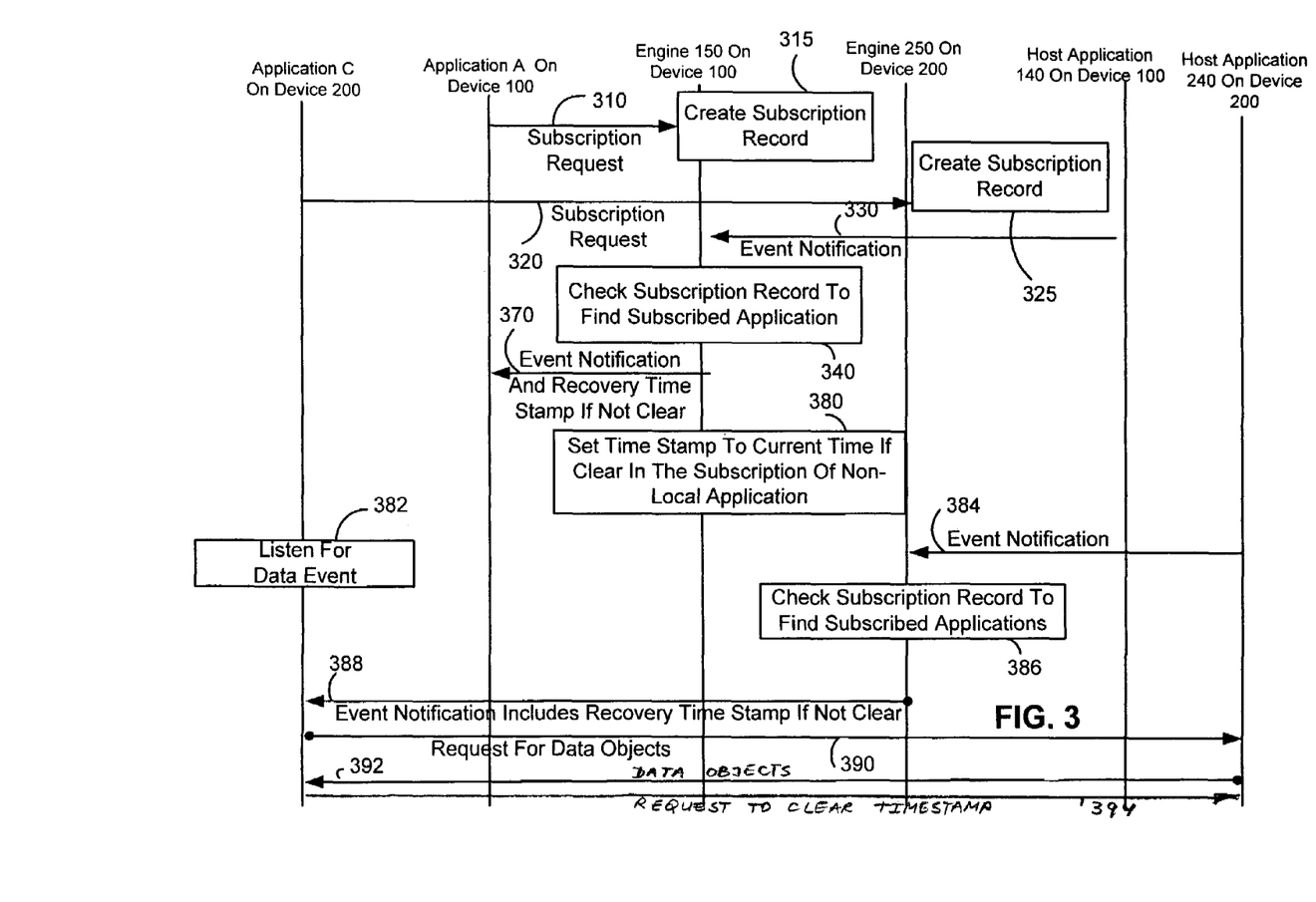
FIG. 3 is an event diagram of a method for providing event notification.

FIG. 3 is an event diagram illustrating exemplary transactions among Application C running on computing device 200, Application A running on computing device 100, event notification engine 150, event notification engine 250, host application 140 and host application 240 according to an embodiment of the present invention. In FIG. 3, the above entities are listed across the top. Beneath each entity is represented by a vertical line, representing the passage of time. The horizontal arrows between the vertical lines represent transactions between the associated entities. FIG. 3 illustrates transactions in only one embodiment of the present invention and the order of the transactions can vary in practice. Moreover, not every transaction is shown in FIG. 3.

Initially, third party applications subscribe to data events. For example, Application C running on device 200 sends 320 a subscription request to event notification engine 250 running on device 200. Similarly, Application A running on device 100 sends 310 a subscription request to event notification engine 150 running on device 100. Engine 250, in turn, creates 325 a subscription record for Application C. As previously described, a subscription record includes a computing device ID, data object(s), data event operation (s), and data event recovery time stamp. Engine 150, in turn, creates 315 a subscription record for application A. When Host application 140 opens data file 160, event notification engines 150 and 250 propagate the subscription records to the data file 160

When a data event occurs on computing device 100, such as a customer record was modified, Host application 140 notifies 330 event notification engine 150 of a data event.

Engine 150 checks 340 subscription records stored in data file 160 to find applications subscribed to the data event. For example, application A running on computing device 100 and application C running on computing device 200 are subscribed to data object "Customer" and data object operation "Modify." Engine 150 determines whether the subscribed applications are local applications. In one implementation, engine 150 compares the GUID of the computing device on which a data event occurs with the GUID in the subscription record for subscribed applications. If both GUID match, then the subscribed application is a local application. For example, application A is a local application because the GUID in the subscription record for application A matches the GUID of the computing device 100. Application C, in turn, is a non-local application since the GUID in the subscription for that application does not match the GUID of computing device 100 where the data event occurred.

Engine 150 provides 370 an event notification to application A. In one implementation, the notification is a COM callback with an XML message. The notification includes an identification (ID) of a data object and data object operation performed on the data object. Engine 150 also provides the data recovery time stamp from the subscription record of application A if the value of the time stamp is not clear.

Engine 150 also marks 380 the subscription record of Application C as losing data events. In one embodiment, engine 150 sets the data event recovery time stamp in the subscription record for non-local applications to the time when the data event occurs, if the value of the time stamp is not clear.

Application C listens 382 to data events. When a user of computing device 200 accesses data file 160 and, for example, modifies an invoice, a data event occurs on computing device 200. Host application 240 notifies 384 event notification engine 250 of a data event by sending a type of a data object (Invoice) and data object operation (modify). Event notification engine 250 accesses 386 subscription records stored in data file 160 to identify applications that subscribed to this data event. Engine 250 notifies local applications subscribed to this data event and sets the data recovery time stamp in the subscription record for non-local applications. For example, Application C subscribed to the data object (Invoice) and data object operation (Modify). Engine 250 notifies 388 application C of the data event through, for example, a COM callback. Engine 250 accesses the subscription record of Application C to determine whether the data event recovery time stamp is clear. If the time stamp is not clear, it indicates that a data event occurred on another computing device of which Application C has not been notified. In this situation, the callback includes the current data event and a data event recovery time stamp if the value of the time stamp is not clear.

Application C received in the callback a data event recovery time stamp. Application C issues 390 a query against database 190 for subscribed data objects having a time stamp equal or greater to the data event recovery time stamp indicated in the callback. The query for data supports a time-range filter, such as a FromModifiedDate filter and FromDeletedDate filter. An exemplary query for data is shown below:

<CustomerQueryRq>
<FromModifiedDate>Recovery Time</FromModifiedDate>
</CustomerQueryRq>

In this example, the query is executed to receive a current version of a subscribed data object "customer" having a time stamp equal or greater to the time stamp specified in the data event recovery time stamp.

Host application 240 accesses data file 160 and provides 392 data objects indicated in the query to Application C. Once Application C has received a current version of subscribed data objects having a time stamp equal or greater to the time stamp specified in the data event recovery time stamp, it can update its copy of the data objects.

Application C may optionally query for the current version of a data object "Invoice" that was modified, as indicated in the callback that included a data event recovery time stamp (not shown in FIG. 3). At step 394, Application C sends a request to host application 240 to clear its data event recovery time stamp.

In yet another implementation, when a data event occurs, an event notification engine, such as engine 150, adds, to the subscription record for non-local applications, the type of the data object that was changed as a result of the data event. The following example illustrates this embodiment. When a customer record is modified on device 100, engine 150 adds the type of the data object, such as "customer", to the subscription record of the non-local application, such as Application C, subscribed to this data event.

When another data event occurs on computing device 200 where Application C is installed, engine 250 sends a callback to application C notifying Application C of the data event. The callback includes the current event, a data event recovery time stamp for application C if the value of the time stamp is other than clear, and a type of the data object that was changed as a result of the data event that occurred on device 100.

In this embodiment, Application C uses the data event recovery time stamp to query for the current version of the data object "customer" having a time stamp equal or greater to the time indicated in the data event recovery time stamp. This embodiment advantageously improves the data recovery performance because an application queries for a current version of data objects that are provided in the notification along with the data event recovery time stamp rather than issuing queries for all data objects to which the application subscribed to.

In an alternative embodiment, a user working with application C can learn about data events that occur on other computing devices, such as device 100, by issuing a query against the subscription record of Application C to determine whether the data event recovery time stamp is clear. If the time stamp is clear, it indicates that Application C has received a current version of all data objects to which it subscribed to since the last update, and the application does not need to query for data. This implementation advantageously optimizes polling for changes to subscribed data objects because the polling does not have to take place if the Data Event Recovery Time Stamp is clear.

Thus, the present invention advantageously allows applications to learn about changes that occurred to data objects on other computing devices without having the applications to redundantly poll their data event recovery time stamp. Instead, the applications learn about data events that occur on other computing devices when they are called back. Hence application data is always up-to-date upon each callback.

Alternative Embodiments

Event Notification Across Network

Figure 4:
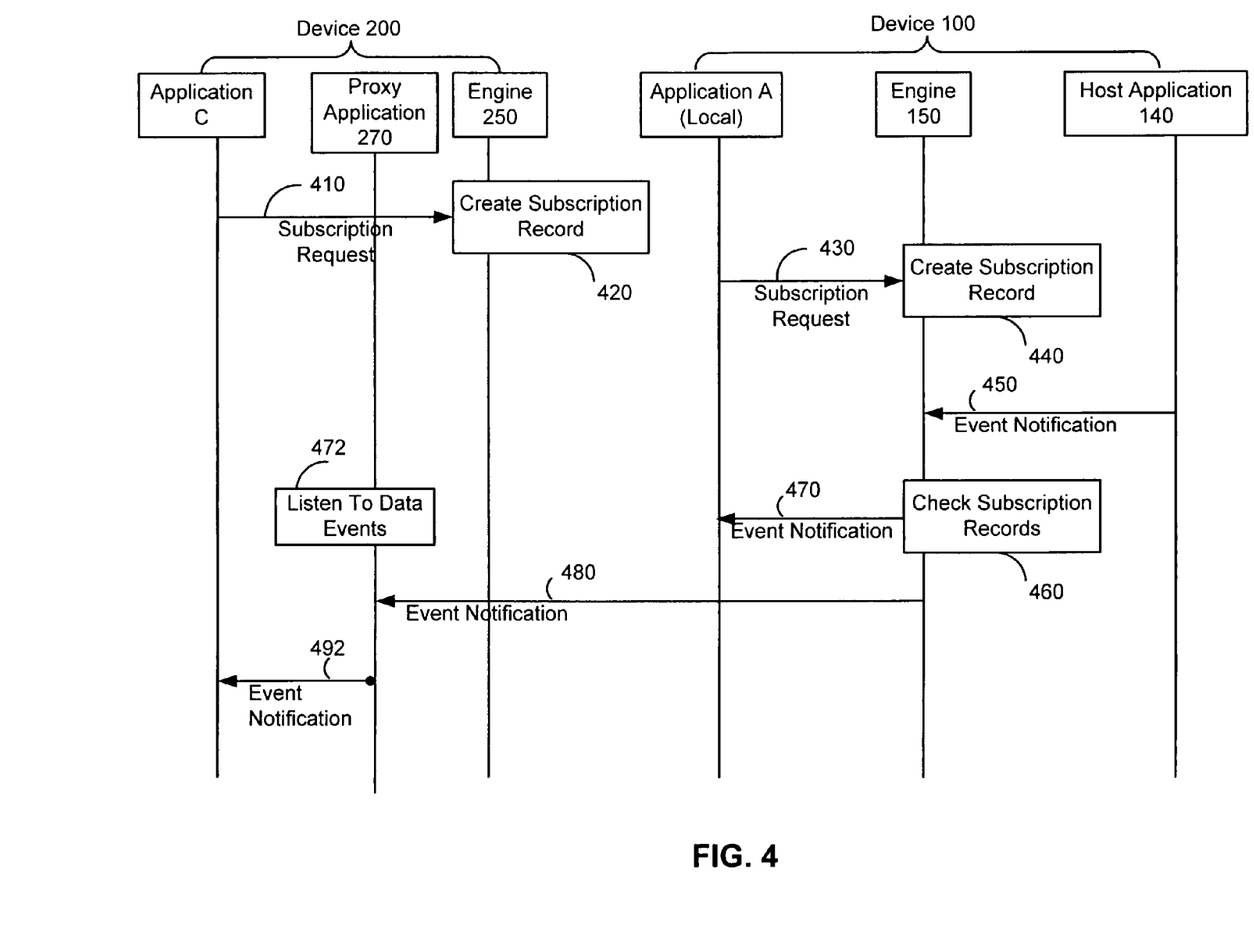
FIG. 4 is an event diagram of a method for providing event notification in another embodiment of the present invention.

In an alternative embodiment, subscribed applications receive notifications about data events that occur on other computing devices via a network, such as LAN 115 of FIG. 1. FIG. 4 is an event diagram illustrating exemplary transactions among Application C running on computing device 200, event notification engine 250 on device 200, proxy application 270 on device 200, application A running on device 100, event notification engine on device 100, and Host application 140 on device 100. Host application Initially, integrated applications subscribe to data events. For example, Application C running on device 200 sends 410 a subscription request to event notification engine 250 running on device 200. Application A running on device 100 sends 430 a subscription request to event notification engine 150 running on device 100. Engines 250 and 150 create a subscription record. In this embodiment, a subscription record includes, among other components, an IP address of a computing device on which a subscribed application is installed. Thus, the subscription record has the following format:

{GUID, Subscriber's ID, Data Object [list of data objects], Data object operation [list of data object operations], Data Event Recovery Time Stamp, IP address}.

When an IP address of a computing device is changed, an event notification engine running on that device updates an IP address in subscription records when a user opens data file 160.

This embodiment also contemplates a situation when a computing device gets assigned an IP address that is currently assigned to another computing device. To address this situation, the notification includes a GUID of the computing device where the data event occurred. A proxy application, such as application 270 shown in FIG. 4, installed on a computing device that receives the notification compares the GUID indicated in the notification with the GUID of the computing device on which it is installed to determine that that computing device is an intended recipient of the notification.

When a data event occurs on device 100, Host application 140 notifies 450 event notification engine 150 of a data event. Engine 150 checks 460 subscription records in data file 160 to find applications subscribed to this data event. Engine 150 uses the IP address of the computing device on which an application subscribed to the data event is running to notify the application about the data event. For example, if Application C running on device 200 is subscribed the data event provided in the notification, engine 150 provides a notification to proxy application 270.

Proxy application 270, in turn, listens 472 for data events. In one implementation, proxy application 270 receives 480 an event notification from engine 150. The notification includes information needed to call back an application. Such information may include, for example, an ID of the subscribed application. Proxy application 270 uses the ID of the subscribed application to route 492 the event notification to the subscribed application.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A computer-implemented method for receiving by a first application running on a first computing device a notification of data events that occur on a second computing device, the method comprising:

subscribing by the first application running on the first computing device and by a second application running on the second computing device to a data event in a data file accessible by the first application and the second application, wherein in response to the subscribing, data subscription records for the first application and the second application are generated, wherein the data event comprises creation, deletion, or modification of a data object in the data file, wherein the data subscription records identify at least one of: the data object in the data file and an operation performed on the data object; wherein the data subscription records are stored in the data file, and wherein the data event can occur on the first computing device and the second computing device;

when a data event occurs on the second computing device, determining whether the first and second applications are local or non-local to the data file;

based on the determination that the second application is local, receiving by the second application on the second computing device a notification of the data event that occurred in the data file, wherein the notification includes an identification of a data object and data operation performed on the data object; and based on the determination that the first application is non-local, setting a data event recovery time stamp in the data subscription record of the first application to specify a time when the data event occurred; and when the first application accesses the data file, requesting by the first application a current version of the subscribed data objects on which a data operation occurred on the second computing device at or after the specified time, wherein the data operation comprises creation, deletion, or modification of a data object in the data file.

2. The method of claim 1, further comprising sending a request to clear the data event recovery time stamp after the subscribed application is provided the current version of the subscribed data objects.

3. The method of claim 1, wherein the data object has a time stamp specifying the time when the last data event occurred on the data object, and wherein the requesting step further comprises:

requesting by the first application, from the data file, a current version of subscribed data objects having a time stamp equal or greater to the time specified in the data event recovery time stamp.

4. The method of claim 1, wherein the data file is stored on a network connecting the first computing device and the second computing device.

5. The method of claim 1, wherein the notification further includes an identification of the subscribed data object on which the data event occurred, and wherein the method further comprises:

requesting by the first application, from the data file, a current version of the subscribed data objects included in the notification on which the subscribed data event occurred on the second computing device at or after the specified time.

6. A computer-implemented method for receiving by a first application running on a first computing device a notification about data events that occur on a second computing device, the method comprising:

subscribing by the first application running on the first computing device and by a second application running on the second computing device to a data event in a data file accessible by the first application and the second application, wherein in response to the subscribing, data subscription records for the first application and the second application are generated, wherein the data event comprises creation, deletion, or modification of a data object in the data file, wherein the data subscription records identify at least one of: the data object in the data file and an operation performed on the data object, wherein the data subscription records are stored in the data file, and wherein the data event can occur on the first computing device and the second computing device;

when a data event occurs on the second computing device, determining whether the first and second applications are local or non-local to the data event, and based on the determination that the first application is non-local, setting a data event recovery time stamp in the data subscription record of the first application specifying the time when the data event occurred of which the first application has not been notified;

querying the subscription record of the first application to determine whether the subscribed data event occurred on a data object in the data file on the second computing device, wherein the data subscription record includes a data recovery time stamp which specifies a time when the data event occurred; and when the first application accesses the data file, requesting by the first application a current version of the data object on which the subscribed data event occurred on the second computing device at or after the time specified in the data event recovery time stamp in response to the determination that the subscribed data event occurred on the subscribed data objects on the second computing device.

7. The method of claim 6, wherein determining whether a subscribed data event occurred on a data object in the data file on the second computing device further comprises determining whether the data event recovery time stamp is clear.

8. The method of claim 6, wherein the data object has a time stamp specifying the time when the last data event occurred on the data object, and wherein the requesting step further comprises:

requesting by the first application, from the data file, a current version of subscribed data objects having a time stamp specifying the time equal or greater to the time specified in the data event recovery time stamp in response to the determination that the subscribed data event occurred on the subscribed data objects on the second computing device.

9. A computer system for providing to a first application running on a first computing device a notification about a data event occurring on a second computing device, the system comprising:

a first computing device;

a first event notification engine running on the first computing device adapted to receive a request from a first application to subscribe to a data event in a data file accessible by the first application, generate a subscription record for the first application based on the subscription request, wherein the data subscription records identify at least one of: the data object in the data file and an operation performed on the data object, wherein the data subscription records are stored in the data file, notify the application of the data event occurring in the data file by a second application on the second computing device at a specified time, and provide to the subscribed application a current version of all subscribed data objects on which data events occurred at or after a specified time, wherein the data event comprises creation, deletion, or modification of a data object in the data file, and wherein the data event can occur on the first computing device;

a second computing device; and a second event notification engine running on the second computing device adapted to receive a request from the second application running on the second computing device to subscribe to a data event in the data file accessible by the second application, and when the data event in the data file occurs on the second computing device, the second event notification engine is adapted to determine whether the first and second applications are local or non-local to the data event, and based on the determination that the second application is local and the first application is non-local, send a notification of the data event to the second application and provide an indication to the first application running on the first computing device by setting a data recovery time stamp specifying a time when the data event occurred, in the subscription record of the first application.

10. The computer system of claim 9, wherein the first event notification engine is further adapted to check the subscription record to identify an application subscribed to a data event upon receiving a notification of the data event.

11. The computer system of claim 9, wherein the subscription record includes at least one of an identification of a computing device, an identification of the subscribed application, an identification of a subscribed data object, a subscribed data object operation performed on the data object, and a data event recovery stamp specifying the time when a first data event occurred of which the application has not been notified.

12. The computer system of claim 9, wherein the subscription record includes a data event recovery time stamp specifying the time when a first data event occurred on the second computing device of which the application has not been notified, and wherein the second notification engine is further adapted to set the data event recovery time stamp to the time when the data event occurred responsive to the data event recovery time stamp being clear.

13. The computer system of claim 9, wherein the first event notification engine is further adapted to receive a request from the application to clear the data event recovery stamp in the subscription record upon providing to the application the current version of the subscribed data objects.

14. The computer system of claim 12, wherein the first notification engine is further adapted to provide the data event recovery time stamp to the application responsive to the time stamp not being clear.

15. The computer system of claim 9, wherein the first notification engine is further adapted to:

provide to the subscribed application an identification of the subscribed data object on which the data event occurred, and provide to the subscribed application a current version of the subscribed data object on which the subscribed data event occurred on the second computing device at or after the specified time.

16. A computer system for providing to a first application running on a first computing device a notification about a data event that occurred on a second computing device, the first and the second computing devices are connected over a network, the system comprising:

a first computing device;

a first event notification engine running on the first computing device adapted to receive a request from the first application to subscribe to a data event, generate a subscription record for the first application based on the subscription request, and store the subscription record in the data file, wherein the data event comprises creation, deletion, or modification of a data object in the data file, wherein the data subscription records identify at least one of: the data object in the data file and an operation performed on the data object, and wherein the data file is accessible to applications on the first computing device and the second computing device;

the second computing device;

a second event notification engine running on the second computing device adapted to receive a request from a second application running on the second computing device to subscribe to a data event in the data file accessible by the second application, and when the data event in the data file occurs on the second computing device, the second event notification engine is adapted to determine whether the second applications is local or non-local to the data event, and based on the determination that the second application is local, send a notification of the data event to the second application, identify the first computing device that executes applications subscribed to the data event that occurs on the second computing device, and determine whether the first application is local or non-local to the data event, and based on the determination that the first application is non-local, indicate to the first application running on the first computing device the occurrence of the data event by setting a data event recovery time stamp in the subscription record of the first application specifying the time when the data event occurred; and an application proxy running on the first computing device adapted to listen to data events that occur on the second computing device, receive the notification from the second event notification engine about the data events that occurred on the second computing device, and notify the applications subscribed to the data events of the data events that occurred on the second computing device.

17. The computer system of claim 16, wherein the subscription record includes an IP address of a computing device on which a subscribed application is running.

18. The computer system of claim 17, wherein the second event notification engine is further adapted to use the IP address of a computing device on which a subscribed application is running to notify the computing device of the data events that occur on the second computing device.

19. A computer-readable storage medium having computer program code embodied that when executed by a computer cause the computer to perform a method for receiving by a first application running on a first computing device a notification of data events that occur on a second computing device, the method comprising:

subscribing by the first application running on the first computing device and by a second application running on the second computing device to a data event in a data file accessible by the first application and the second application to generate data subscription records for the first application and the second application, the data event comprising a data operation occurring on a data object in the data file, wherein the data operation comprises creation, deletion, or modification of a data object in the data file, wherein the data subscription records identify at least one of: the data object in the data file and an operation performed on the data object, wherein the data subscription records are stored in the data file, and wherein the data file is accessible to applications on the first computing device and the second computing device;

when a data event occurs on the second computing device, determining whether the first and second applications are local or non-local to the data event;

based on the determination that the second application is non-local, receiving a notification of the data event that occurs in the data file by the second application on the second computing device, the notification includes an identification of a data object and data operation performed on the data object;

based on the determination that the first application is local, setting a data event recovery time stamp in the subscription record of the first application specifying the time when the data event occurred; and when the first application accesses the data file, requesting by the first application a current version of the subscribed data objects on which data events occurred on the second computing device at or after the specified time.

* * * * *